(12) United States Patent
Gould et al.

(10) Patent No.: US 8,949,982 B2
(45) Date of Patent: Feb. 3, 2015

(54) METHOD FOR ADMINISTERING A TOP-LEVEL DOMAIN

(75) Inventors: James Gould, Leesburg, VA (US); Srikanth Veeramachaneni, South Riding, VA (US); Deepak Deshpande, Herndon, VA (US); Pamela Dicioccio, Marshall, VA (US)

(73) Assignee: Verisign, Inc., Reston, VA (US)

( * ) Notice: Subject to any disclaimer, the term of this patent is extended or adjusted under 35 U.S.C. 154(b) by 288 days.

(21) Appl. No.: 13/341,099

(22) Filed: Dec. 30, 2011

(65) Prior Publication Data

US 2013/0174254 A1 Jul. 4, 2013

(51) Int. Cl.
G06F 21/00 (2013.01)

(52) U.S. Cl.
USPC .......................................................... 726/22

(58) Field of Classification Search
USPC ............................................ 726/22; 713/188
See application file for complete search history.

(56) References Cited

U.S. PATENT DOCUMENTS

| | | | |
|---|---|---|---|
| 7,076,541 B1 | 7/2006 | Burstein et al. | |
| 7,251,826 B1 | 7/2007 | Gardos et al. | |
| 7,548,968 B1 | 6/2009 | Bura et al. | |
| 7,752,260 B2* | 7/2010 | King et al. | 709/203 |
| 8,112,804 B2* | 2/2012 | Kwon et al. | 726/23 |
| 2002/0091703 A1 | 7/2002 | Bayles | |
| 2006/0101155 A1 | 5/2006 | Damour et al. | |
| 2007/0204038 A1 | 8/2007 | Majumdar et al. | |
| 2008/0155694 A1 | 6/2008 | Kwon et al. | |
| 2009/0025088 A1 | 1/2009 | Naito | |
| 2010/0037314 A1* | 2/2010 | Perdisci et al. | 726/22 |
| 2010/0162350 A1* | 6/2010 | Jeong et al. | 726/1 |
| 2012/0173681 A1* | 7/2012 | Gould et al. | 709/221 |
| 2012/0173685 A1* | 7/2012 | Shorter et al. | 709/223 |
| 2012/0304244 A1* | 11/2012 | Xie et al. | 726/1 |
| 2013/0036468 A1* | 2/2013 | Georgiev | 726/23 |
| 2013/0247183 A1* | 9/2013 | Kumar et al. | 726/22 |

FOREIGN PATENT DOCUMENTS

WO WO2006/067641 6/2006

OTHER PUBLICATIONS

Cisco ASA 5500 Series Adaptive Security Appliances, Combating Botnets Using the Cisco ASA Botnet Traffic Filter, pp. 1-7; http://www.cisco.com/en/US/prod/collateral/vpndevc/ps6032/ps6094/ps . . . .
Goodchild, Joan, Senior Editor, CSO, New Method Finds Bonets that Hide Behind Changing Domains, CSO Online; pp. 1-8; http://www.csoonline.com/article/678319/new-method-finds-bonets-that . . . .
Damballa, Inc., "Damballa FirstAlert—Advanced Cyber Threat Intelligence,"http://www.damballa.com/solutions/damballa_firstalert.php.

* cited by examiner

Primary Examiner — Amare F Tabor
(74) Attorney, Agent, or Firm — MH2 Technology Law Group, LLP (57) ABSTRACT

A method for administering a top-level domain by analyzing domain name registrations for requests for suspicious or malicious domain names. A request to register a domain name is received. The requested domain name's information may be stored in a registry database. The requested domain name may also be conditionally stored in the domain name system (DNS) zone. The requested domain name is compared to a list of botnet domain names stored in a watch list database. If the requested domain name corresponds to one of the botnet domain names, the requested domain name is prevented from being added to the DNS zone or is removed from the DNS zone, if it has already been stored there. The information regarding the requested domain name is stored in the registry database, even if the domain name does not ultimately stay in the DNS zone.

27 Claims, 6 Drawing Sheets

METHOD FOR ADMINISTERING A TOP-LEVEL DOMAIN

TECHNICAL FIELD

The present disclosure relates to the field of malware detection and prevention, and more particularly, to methods for preventing the registration of malicious domain names in the domain name system (DNS).

BACKGROUND OF THE DISCLOSURE

Malware, short for "malicious software," is software that is designed for hostile or intrusive purposes. For example, malware may be designed with the intent of gathering confidential information, denying or disrupting operations, accessing resources without authorization, and other abusive purposes. Types of malware include, for example, computer viruses, worms, trojan horses, spyware, adware, and botnets. Malware developers typically distribute their software via the Internet, often clandestinely. As Internet use continues to grow around the world, malware developers have more incentives than ever for releasing this software. In fact, studies indicate that the release rate of malicious software today could even be exceeding that of legitimate software.

Botnets are one example of malware that have become a major security threat in recent years. A botnet is a network of "innocent" host computers that have been infected with malicious software in such a way that a remote attacker is able to control the host computers. The malicious software used to infect the host computers is referred to as a "bot," which is short for "robot." Botnets operate under a command and control (C&C) architecture, where a remote attacker is able to control the infected computers, often referred to as "zombie" computers. An attacker may control the infected computers to carry out online anti-social or criminal activities, such as e-mail spam, click fraud, distributed denial-of-service attacks (DDoS), or identity theft.

Figure 1:
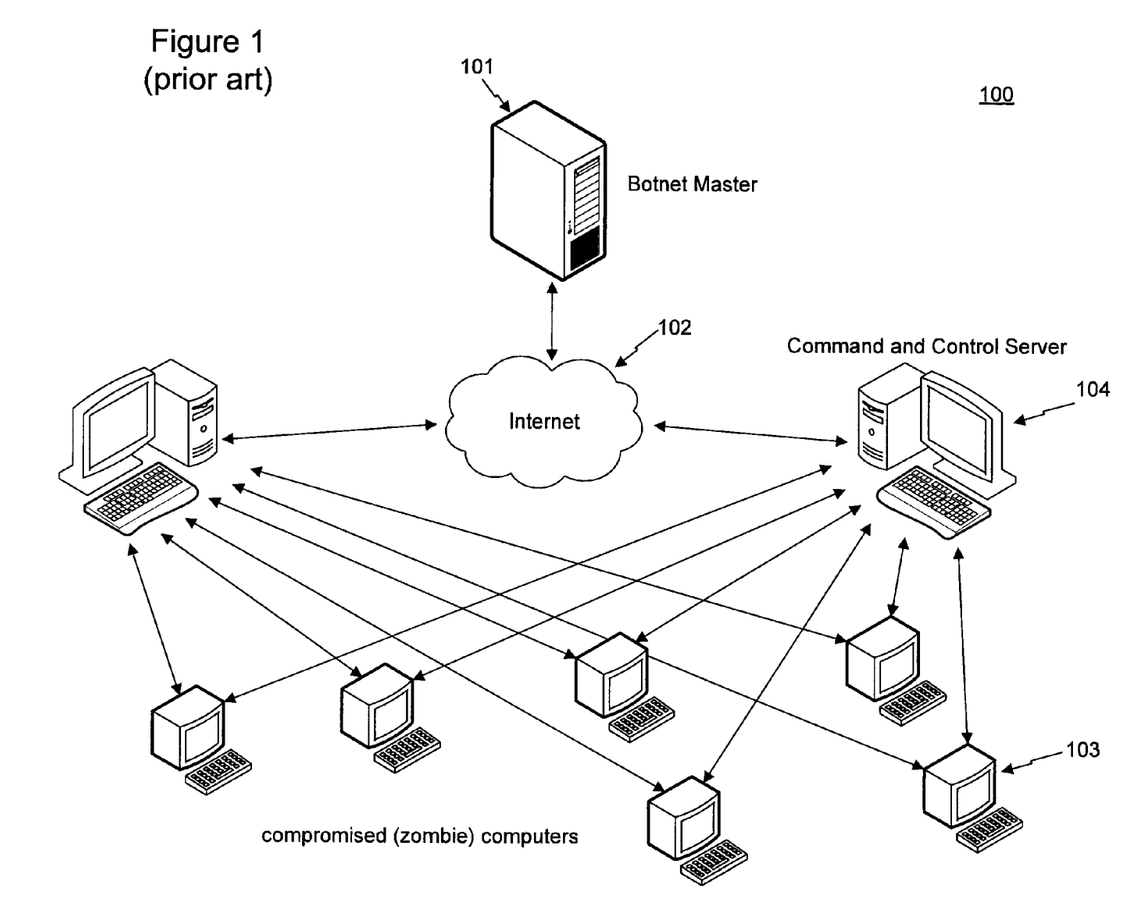
FIG. 1 illustrates a C&C network architecture of a botnet.

FIG. 1 illustrates an exemplary C&C architecture of a botnet 100. The botnet master 101, often referred to as a "botmaster" or "bot herder," distributes malicious bot software, typically over the Internet 102. This bot software stores an indication of a future time and of domain names to contact at the indicated future time. The bot software infects a number of host computers 103 causing them to become compromised. Users of host computers 103 typically do not know that the bot software is running on their computers. Botnet master 101 also registers temporary domain names to be used as C&C servers 104. Then, at the indicated future time, the bots instruct host computers 103 to contact C&C servers 104 to get instructions. The instructions are sent over a C&C channel via the Internet 102. The ability to send instructions to host computers 103 provides botnet master 101 with control over a large number of host computers. This enables botnet master 101 to generate huge volumes of network traffic, which can be used for e-mailing spam messages, shutting down or slowing web sites through DDoS attacks, or other purposes.

Botnets exploit the domain name system (DNS) to rally infected host computers. The DNS allows people using the Internet to refer to domain names, rather than Internet Protocol (IP) addresses, when accessing websites and other online services. Domain names, which employ text characters, such as letters, numbers, and hyphens (e.g., "www.example.com"), will often be easier to remember than IP addresses, which are numerical and do not contain letters or hyphens (e.g., "128.1.0.0"). The DNS is the Internet's hierarchical lookup service for mapping character-based domain names meaningful to humans into numerical IP addresses.

Domains exist at various different levels within the DNS hierarchy. For example, a generic top-level domain (gTLD), such as .com or .net, is a domain at the highest level in the DNS hierarchy. Another type of TLD is a country-code top-level domain (ccTLD) such as, for example, ".uk." A second-level domain (SLD) is a subdomain of a TLD (including gTLD and ccTLD), which is directly below the TLD in the DNS hierarchy. For example, "corn" is the TLD and "example" is the SLD for the domain name "www.example.com." An "n-level" domain can indicate any level of domain, including top-level, second-level, etc.

Botnets exploit the DNS by pervasively registering domain names to be temporarily used as C&C servers 104. Domain name registration is the process by which a "Registrant" (typically an individual user or an organization) can reserve or lease the use of a domain name for a specified period of time from the date of registration. The Registrant may reserve the domain name in units of months or years, but typically between one and ten years. Domain names are reserved through domain "Registrars." Registrars are entities having business relationships with domain "Registries," which control the domain names and maintain a domain name database for a particular TLD. Thus, a Registrar provides the interface by which a Registrant can reserve or lease a domain name from a Registry. The Registry manages the reserved names and available names for a particular TLD and makes available certain information to the Registrar through the Extensible Provisioning Protocol (EPP). Registrars that are authorized by the Registry have the ability to check, create, update, delete, renew, transfer, and get information for domain names through the EPP. The Registry provides the EPP as a communications gateway to Registrars for such purposes.

In a typical domain name registration example, a Registrant may want to reserve the domain name "example.com." The Registrant would contact a Registrar that has a business relationship with the Registry that operates the .com TLD. For example, the company GoDaddy is a known Registrar, and the company Verisign is a known Registry. The Registrant would query the Registrar as to the availability of the domain name "example" in the .com namespace. The Registrar in turn would query the proper Registry for the .com TLD through the EPP, and then return the results to the Registrant. The Registrant may then obtain a registration of the domain name by paying a registration fee and providing information required by the Registry and Registrar. The Registry charges the Registrar for the domain name registration and the Registrar collects the registration fee from the Registrant.

To maintain a domain name in accordance with current regulations, the Registry responsible for a TLD is required to maintain a certain minimum amount of information associated with the domain name to ensure proper identification, security features, and operability associated with the domain name. For example, domain Registrars may be required to make available to the Registry current domain contact information. Also, in order for a domain name to work correctly, the Registry must have nameserver information for the domain to load into its TLD DNS system to refer outside DNS requests to the proper authoritative DNS servers. Also, to prevent accidental changes to the domain name settings, certain status codes are available to put various levels of protection on the domain name.

Status codes are designations that can be assigned and removed by the Registry or the Registrar of a domain name. Status codes may provide security for a domain name to prevent, for example, the domain name from being accidently transferred or deleted. These status codes are stored in the registry database and associated with respective domain names. The available status codes that can be returned by the EPP system for domain name provisioning are defined as "status values" in the standards described in RFC5731 (referred to as "the standards"). When a Registry sets a status code, it is designated a "server" code. And when a Registrar sets a status code, it is designated a "client" code.

Many botnet masters pervasively register domain names to be temporarily used as botnet command and control (C&C) servers and then dynamically change the IP addresses associated with the domain names to avoid detection. Infecting host computers with bots containing domain names of the botnet C&C servers allows the host computers to contact the appropriate C&C servers through DNS resolution, even if the IP addresses of the C&C servers have changed. Thus, bots may locate botnet C&C servers according to their domain names, rather than their IP addresses. Some botnets frequently change the domain names they use for resolution, and these domain names may even be randomly assigned.

Often, botnet masters use an algorithm to register various permutations of a single domain name theme (e.g., "www.example.com," "www.1example.com," "www.example1.com," etc.). Botnet masters can use algorithms to create a very large number of domain names for registration under a particular theme.

Approaches have been taken to prevent botnet masters from perpetuating a domain name theme across the Internet. In one approach, a Registry receives a list of suspicious domain names from a concerned entity, which could include law enforcement, Registrars, legal entities, etc. Upon receipt, the Registry would then register to itself as many possible permutations of each suspicious domain name as it can, so that no botnet master can register them. The Registry, however, cannot possibly scale the very large number of domain names that botnet masters can create.

As botnet domain names can change quickly over time, preventing or removing the suspicious domain names from the DNS zone as quickly as possible becomes important. And Registries may find registering every possible permutation of a suspicious domain name difficult and expensive to implement. Registries would therefore benefit from a scalable approach that analyzes domain names at the registration stage to protect the DNS zone from botnets.

Some approaches to protecting the DNS zone have included blocking the registration of a suspicious domain name altogether. In this approach, a Registrar sends a registration request for a domain name that may not yet exist (e.g., "www.hypothetical.com") to a Registry. The Registry receives this "Domain Create" request typically through EPP, which provides the communication link between Registries and Registrars during domain name registration.

Upon receipt of the "Domain Create" request, the Registry compares the requested domain name to a list of suspicious domain names. If the requested domain name appears on the list, or resembles a name on the list, the Registry rejects the "Domain Create" request and returns an error message to the Registrar. The Registry does not allow the requested domain name to be added to the DNS zone. However, with this procedure the Registry also does not store information regarding the requested domain name in any database.

This approach fails to continuously monitor a specific suspicious domain name and fails to track any information on the Registrar and Registrant that attempted to register the suspicious domain name. The Registry is unable to provide to law enforcement or other agencies any information on the rejected domain name's registration.

SUMMARY

In accordance with an embodiment, a method for administering a top-level domain across a domain name system (DNS) may be provided. The method may comprise receiving a request to register a domain name. A name check of the requested domain name is initiated to determine if the requested domain name corresponds to a known malicious domain name. The requested domain name is processed such that if the name check has determined that the requested domain name does not correspond to the known malicious domain name, the requested domain name is added to the DNS. If the name check has determined that the requested domain name corresponds to the known malicious domain name, the requested domain name does not appear in the DNS after more than a predetermined number of DNS update operations. Information regarding the domain name registration request is stored in a registry database, even if the name check has determined that the requested domain name corresponds to the known malicious domain name.

In another embodiment, a method for administering an n-level domain across a domain name system (DNS) may be provided. The method may comprise receiving, in a registry database, a watch list of at least one known malicious domain name. The watch list is propagated across at least one n-level domain. A request to register a domain name is received, and the watch list is accessed to determine if the requested domain name corresponds to one of the malicious domain names in the watch list. The requested domain name is processed such that if the name check has determined that the requested domain name does not correspond to the known malicious domain name, the requested domain name is added to the DNS. If the name check has determined that the requested domain name corresponds to the known malicious domain name, the requested domain name does not appear in the DNS after more than a predetermined number of DNS update operations. Information regarding the domain name registration request is stored in a registry database, even if the name check has determined that the requested domain name corresponds to the known malicious domain name.

Additional aspects related to the embodiments will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

DETAILED DESCRIPTION

Reference will now be made in detail to the present embodiments of the disclosure, certain examples of which are illustrated in the accompanying drawings.

Figure 2:
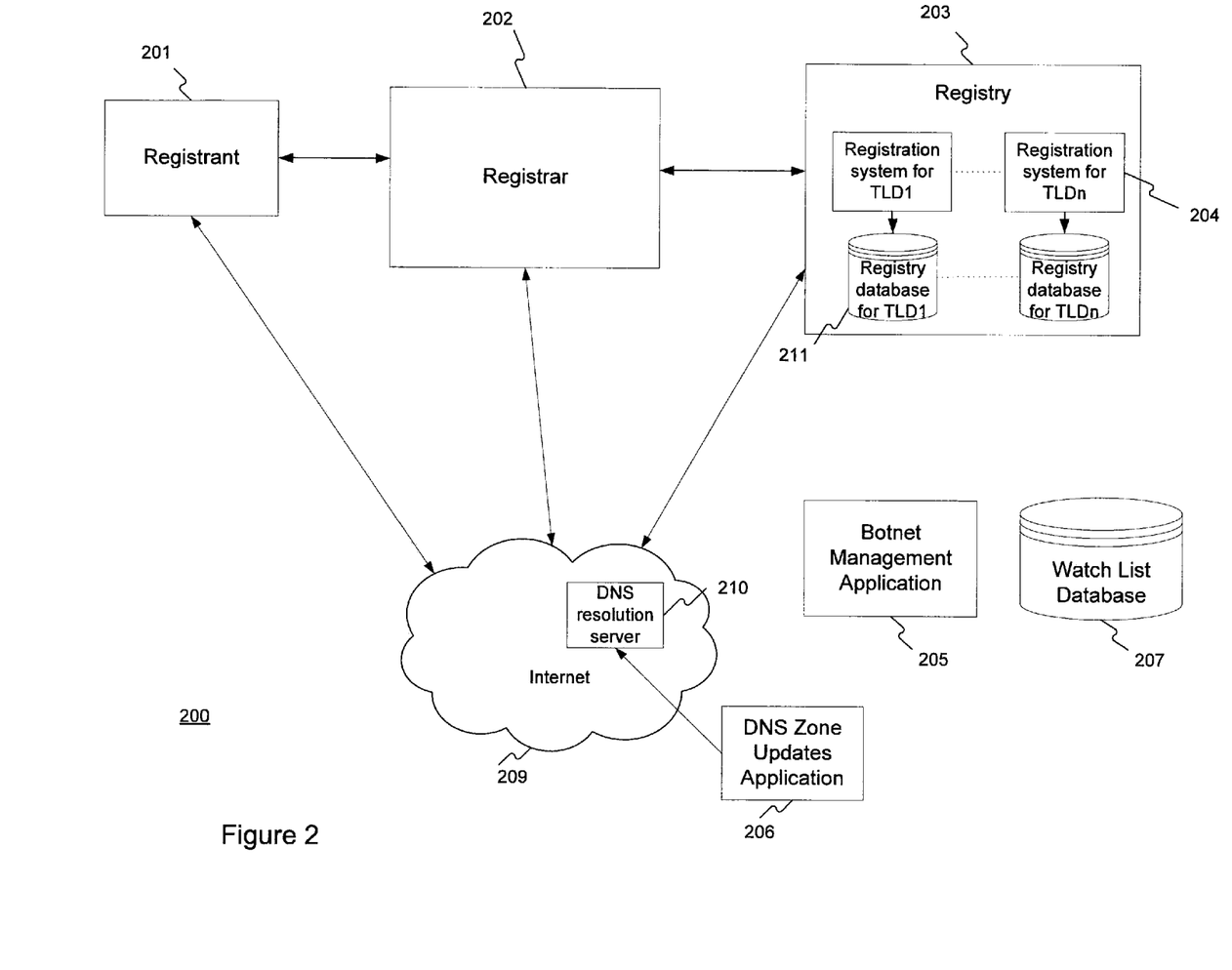
FIG. 2 illustrates an exemplary system in which a Registry administers the registration of malicious domain names using the disclosed embodiments.

FIG. 2 illustrates an exemplary system 200 for carrying out the methods disclosed herein. A Registrant 201 communicates with a Registrar 202, requesting to register a domain name (e.g., "example.com"). Registrar 202, in turn, communicates with a Registry 203 that administers the specified TLD, for example, the .com TLD. Registry 203 includes one or more registration systems 204 for the TLDs it administers. Registry 203 also includes one or more registry databases 211, each corresponding to one of the TLDs Registry 203 administers, for storing and maintaining information regarding the domain name.

Registration system 204 interacts with a Botnet Management Application 205. In one embodiment, Botnet Management Application 205 may replicate a watch list database 207 to a subset of registry database 211. In other embodiments, registration system 204 may communicate with Botnet Management Application 205 via a service call. Watch list database 207 contains suspicious or known botnet domain names that registration system 204 or Botnet Management Application 205 compares requested domain names against.

DNS Zone Updates Application 206 operates periodically to determine whether registration system 204 has made any changes to registry database 211. For example, registration system 204 may add a new domain name to registry database 211 and may indicate that it should be added to the DNS zone. DNS Zone Updates Application 206 transmits any detected changes in registry database 211 to DNS resolution server 210 of the Internet 209. Then, DNS resolution server 210 allows those changes to be reflected in the DNS zone. For example, if DNS Zone Updates Application 206 transmits information indicating a new domain name should appear in the DNS zone, DNS resolution server 210 allows that domain name to be resolved to an IP address. DNS Zone Updates Application 206 may operate asynchronously of registration system 204 and Botnet Management Application 205.

Figure 3:
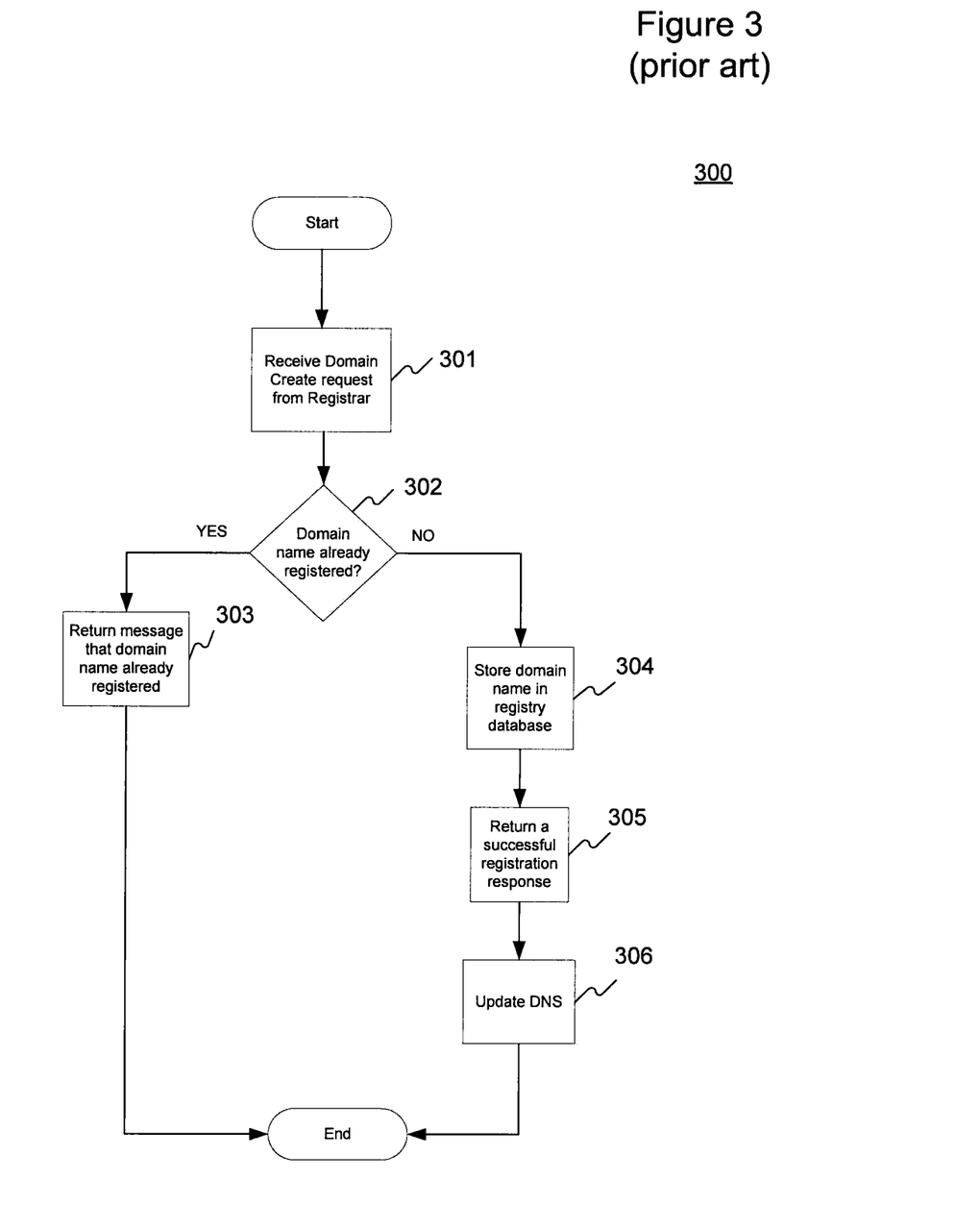
FIG. 3 illustrates a method used in the prior art for processing a registration request for a domain name.

FIG. 3 illustrates a prior art method 300 used by Registry 203 (FIG. 2) for processing a request to register a domain name, received through Registrar 202 from Registrant 201. In step 301, Registry 203 receives a "Domain Create" request from Registrar 202, requesting Registry 203 to lease a domain name (e.g., "www.example.com") to Registrant 201. Registrar 202 typically sends the "Domain Create" request after Registrant 201, which may be an individual user or an organization, asks Registrar 202 to register the domain name.

In step 302, Registry 203 accesses registration system 204 (FIG. 2) for the particular TLD sought, and determines whether the requested domain name has already been registered. In step 303, if the requested domain name has been registered, registration system 204 returns a message, that Registry 203 sends to Registrar 202, stating that the requested domain name has already been registered. In one embodiment, the message may consist of an error message. Typically, Registrar 202 notifies Registrant 201 that they cannot successfully process the registration request for this particular domain name. Registrant 201 is then not required to pay a fee or provide any required information to Registrar 202.

In step 304, if the requested domain name has not yet been registered, registration system 204 stores the domain name, and information associated therewith, in registry database 211 (FIG. 2). In step 305, registration system 204 returns a message, that Registry 203 sends to Registrar 202, stating that the requested domain name has now been registered. Typically, Registrar 202 notifies Registrant 201 that they successfully processed the registration request for this particular domain name. Registrant 201 would then be the lessee of the domain name and would have the ability to update, transfer, or delete it. Registrant 201 would also have to pay Registrar 202 a fee and provide required registration information.

In step 306, DNS Zone Updates Application 206 processes the addition of the requested domain name in registry database 211. DNS Zone Updates Application 206 operates asynchronously with registration system 204, and periodically detects changes that it must process to update the DNS zone. In one embodiment, registration system 204 persists the registration information to assist DNS Zone Updates Application 206 in processing the changes to the DNS zone. In other embodiments, registration system 204 inserts specific messages in a resolution queue that is processed asynchronously by DNS Zone Updates Application 206. DNS Zone Updates Application 206 will add the requested domain name to the DNS zone by sending it to DNS resolution server 210 of the Internet 209. The requested domain name can then be resolved to an IP address.

Figure 4:
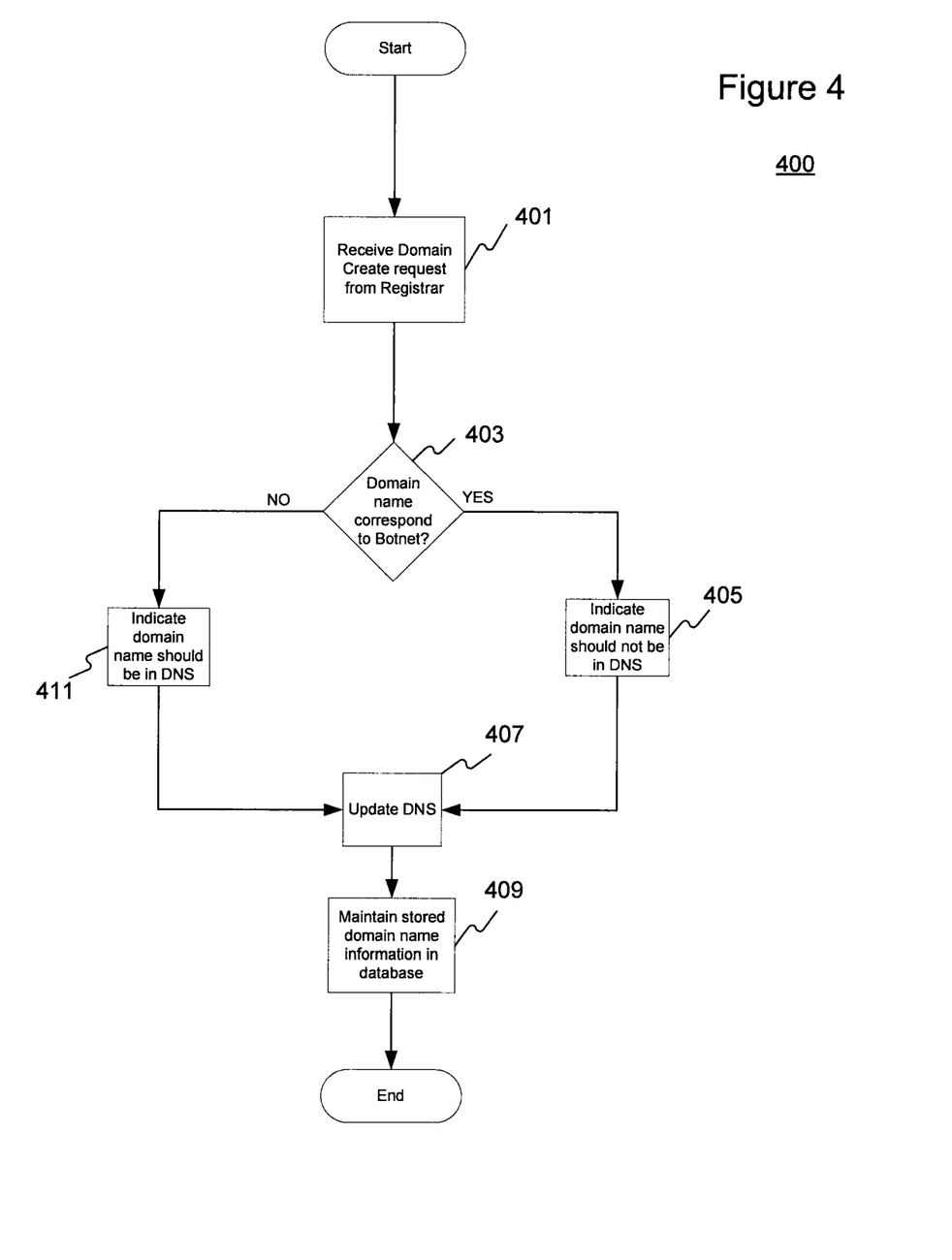
FIG. 4 illustrates an exemplary method for determining whether a domain name corresponds to a botnet via a service call for implementing the disclosed embodiments.

FIG. 4 illustrates a flowchart for an exemplary method 400 used by Registry 203 for administering a top-level domain. In step 401, Registry 203 receives a "Domain Create" request from Registrar 202, requesting Registry 203 to lease a domain name (e.g., "www.example.com") to Registrant 201.

In step 403, Registry 203 accesses registration system 204 for the specified TLD, which sends a service call to Botnet Management Application (FIG. 2). Botnet Management Application 205 then initiates a check to determine whether the requested domain name corresponds to a malicious domain name (e.g., a botnet). Botnet Management Application 205 compares the requested domain name to a list of botnet domain names in watch list database 207 for the specified TLD. In one embodiment, Botnet Management Application 205 determines whether the requested domain name, or a variant thereof, appears in watch list database 207.

If the requested domain name does not correspond to a botnet domain name in watch list database 207, Botnet Management Application 205 notifies registration system 204 that the requested domain name does not correspond to a botnet. In that case, registration system 204 in step 411 indicates that the requested domain name should be added to the DNS zone. If the requested domain name does correspond to a botnet domain name in watch list database 207, Botnet Management Application 205 notifies registration system 204 that the requested domain name corresponds to a botnet. In step 405, registration system 204 then indicates that the domain name should not be added to the DNS zone.

In one embodiment, registration system 204 inserts specific messages in a resolution queue that is processed asynchronously by DNS Zone Updates Application 206. In other embodiments, registration system 204 persists registration information to assist DNS Zone Updates Application 206 in processing the changes to the DNS zone. For example, registration system 204 may indicate whether the requested domain name should be added to the DNS zone by setting an indicator, associated with the requested domain name and stored in registry database 211. In one embodiment, the indicator may include a zone insertion flag associated with the requested domain name. In other embodiments, the indicator may include a server status code associated with the requested domain name. The indicators may be referenced by DNS Zone Updates Application 206 when updating DNS resolution server 210.

Figure 6:
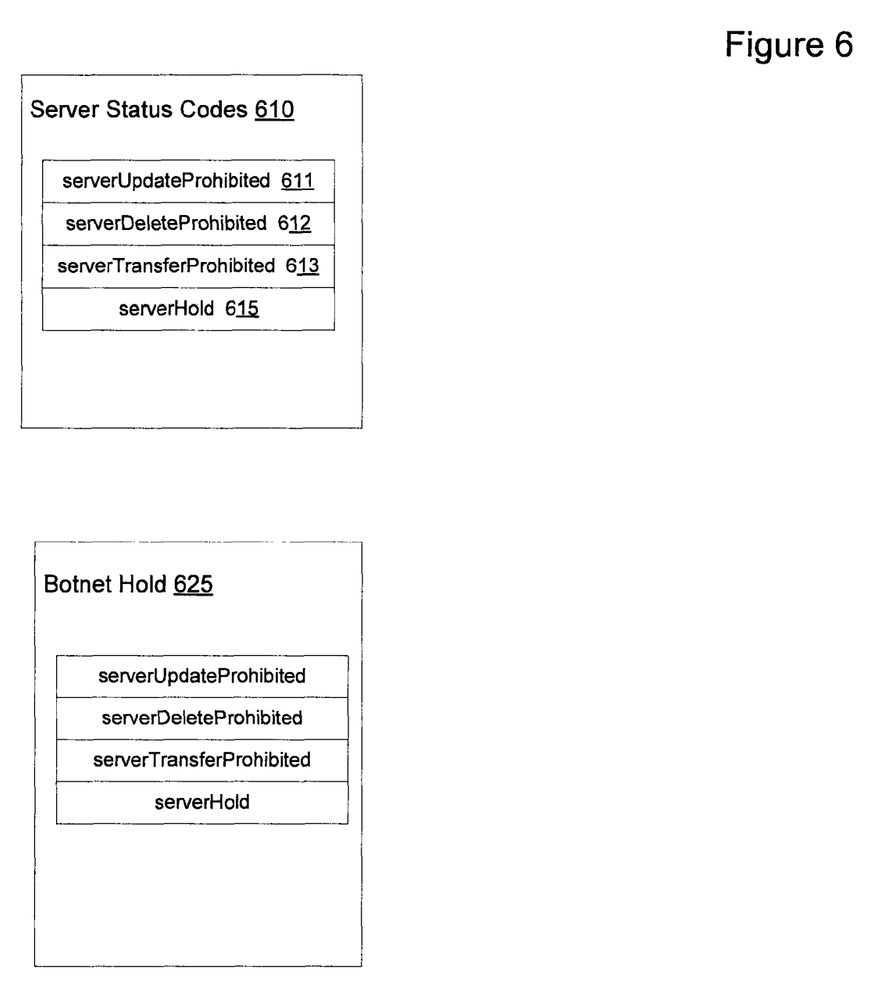
FIG. 6 illustrates an exemplary list of status codes and a status set that a Registry may use in the administration of domain name registrations using the disclosed embodiments.

FIG. 6 illustrates exemplary status codes 610 that registration system 204 could set, when a domain name corresponds to a botnet, to indicate that the domain name should not be added to the DNS zone. For example, registration system 204 may set a "serverHold" 615 status code. Setting serverHold 615 will ensure that the requested domain name does not appear in the DNS zone.

In one embodiment, registration system 204 may set one or more "status sets," where a status set consists of multiple status codes. FIG. 6 also illustrates an exemplary status set Botnet Hold 625. Implementing Botnet Hold 625 would automatically set the serverUpdateProhibited 611, serverDeleteProhibited 612, serverTransferProhibited 613, and serverHold 615 status codes. Setting these status codes will prevent Registrant 201 or Registrar 202 from updating, deleting, or transferring the domain name, respectively, and will ensure the domain name does not appear in the DNS zone.

More information on the status sets can be found in related application Ser. No. 12/982,125, which is incorporated herein in its entirety.

Returning to FIG. 4, in step 407 DNS Zone Updates Application 206, operating asynchronously with registration system 204, updates the DNS zone with the changes made to registry database 211. If the requested domain name did not correspond to a botnet, DNS Zone Updates Application 206 will detect that the requested domain name should be added to the DNS zone and will send it to DNS resolution server 210. If the requested domain name did correspond to a botnet, DNS Zone Updates Application 206 will detect that the requested domain name should not be added to the DNS zone. In that case, DNS Zone Updates Application 206 would not send the requested domain name to DNS resolution server 210, and would otherwise ignore the addition of the requested domain name to registry database 211.

Since DNS Zone Updates Application 206 operates asynchronously with Botnet Management Application 205, in one embodiment DNS Zone Updates Application 206 may add the requested domain name to the DNS zone before the registration system 204 determines whether the requested domain name corresponds to a botnet domain name in watch list database 207. If registration system 204 eventually determines that the requested domain name corresponds to a botnet domain name, registration system 204 will indicate that it should not be in the DNS zone. In that case, DNS Zone Updates Application 206 will detect the indication in registry database 211 and will remove the requested domain name from the DNS zone, for example, in the next periodic update. Therefore, the requested domain name ultimately will not be in the DNS zone after a predetermined number of DNS update operations, for example, one periodic update operation.

In step 409, registration system 204 maintains information stored regarding the requested domain name in registry database 211. Thus, registry database 211 stores and maintains information regarding a domain name, even if the domain name corresponds to a botnet, and therefore, does not appear in the DNS zone. Storing and maintaining this information in registry database 211, instead of returning an error message and not storing and maintaining the information, allows Registry 203 to track and report the domain name. For example, Registry 203 may store registration information related to the time and date of registration, Registrar 202 requesting the registration, and Registrant 201's information, if available. Registry 203 can transmit this stored registration information to law enforcement agencies or other entities that may seek to shut down the botnet, if required.

In one embodiment, registration system 204 may then return a successful registration response to Registrar 202 or Registrant 201 indicating that the requested domain name has now been successfully registered to Registrant 201. The response may be sent even if the requested domain name does not ultimately stay in the DNS zone. Registrant 201 has now successfully leased the requested domain name. But, in the case of a requested domain name that corresponded to a botnet, no Internet user can access the requested domain name in their Internet browser because the requested domain name does not appear in the DNS zone. Moreover, if the requested domain name has one of server status codes 610 set, Registrant 201 and Registrar 202 may not be able to update, delete, or transfer the requested domain name.

Although the above method is described for determining whether a domain name corresponds to a botnet at the time of registration, the disclosure is not so limited. For example, in one embodiment Registry 203 may determine whether the requested domain name corresponds to a botnet domain name by accessing a local database stored in registry database 211, as discussed below regarding FIG. 5.

Figure 5:
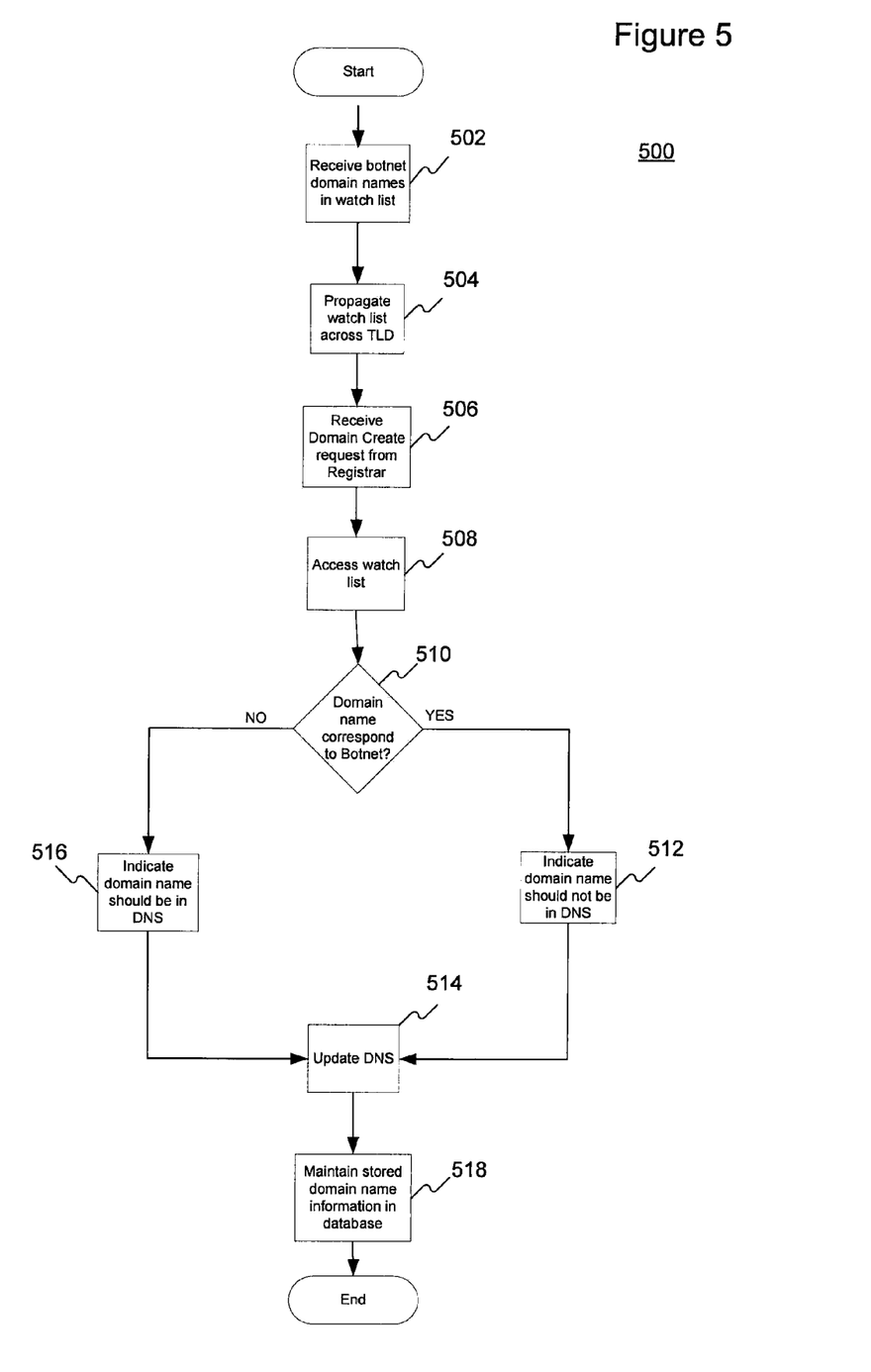
FIG. 5 illustrates an exemplary method for determining whether a domain name corresponds to a botnet via accessing a local database within a Registry for implementing the disclosed embodiments.

FIG. 5 illustrates a flow chart for another exemplary method 500 used by Registry 203 for administering an n-level domain. In step 502, Registry 203 receives watch list database 207 containing at least one botnet domain name from Botnet Management Application 205 (FIG. 2). Watch list database 207 is stored in a subset of registry database 211. Botnet Management Application 205 maintains the list of botnet domain names, which it may receive from a law enforcement agency, Registrars, other Registries, or concerned entities. The list may consist of registered botnet domain names or domain names associated with suspicious or malicious behavior.

In one embodiment, Botnet Management Application 205 pushes watch list database 207 to registry database 211. In another embodiment, Botnet Management Application 205 may push a subset of watch list database 207 to registry database 211. For example, Botnet Management Application 205 may push a subset of watch list database 207 corresponding to the .com TLD to a portion of registry database 211 used for that TLD's purposes. In one embodiment, Botnet Management Application 205 may return a notice that watch list database 207 has been pushed to registry database 211.

In step 504, Registry 203 propagates watch list database 207 across at least one of the TLDs that Registry 203 manages. For example, in one embodiment Registry 203 may only seek to update one TLD with watch list database 207, such as .com and not .org. In another embodiment, Registry 203 may seek to update all the TLDs it manages with watch list database 207. Propagating watch list database 207 across a TLD allows Registry 203 to monitor the domain name registrations of that TLD for the potential registration of a new domain name corresponding to any of the botnet domain names in watch list database 207.

In step 506, Registry 203 receives a "Domain Create" request from Registrar 202, requesting Registry 203 to lease a domain name to Registrant 201. Registration system 204 of Registry 203 then accesses watch list database 207 within registry database 211 in step 508. Registration system 204 compares the requested domain name in step 510 with the domain names stored locally in watch list database 207 of registry database 211 to determine if the requested domain name corresponds to one of the botnet domain names.

Thereafter, steps 512-518 of the FIG. 5 method proceed similarly to steps 405-411 of the method in FIG. 4. For example, if the requested domain name does not correspond to a botnet domain name in watch list database 207, registration system in step 516 indicates that the requested domain name should be added to the DNS zone. If the requested domain name does correspond to a botnet domain name in watch list database 207, registration system 204 indicates that the domain name should not be added to the DNS zone in step 512.

In step 514 DNS Zone Updates Application 206 processes the changes detected in registry database 211 and updates the DNS zone accordingly. For example, if the requested domain name did not correspond to a botnet, DNS Zone Updates Application 206 will detect that the requested domain name should be added to the DNS zone and will send it to DNS resolution server 210. If the requested domain name did correspond to a botnet, DNS Zone Updates Application 206 will detect that the requested domain name should not be added to the DNS zone.

In step 518, registration system 204 maintains any information stored regarding the requested domain name in registry database 211, including information regarding domain names that correspond to a botnet and do not appear in the DNS zone.

Although the above method is described for determining whether a domain name corresponds to a botnet at the time of registration, the disclosure is not so limited. For example, in one embodiment Registry 203 may determine whether the requested domain name has already been registered before accessing watch list database 207 in registry database 211. If the requested domain name has already been registered, Registry 203 may compare the requested domain name to watch list database 207 to determine whether the requested domain name corresponds to a botnet domain name. If the requested domain name does correspond to a botnet domain name, Registry 203 may generate a report that a corresponding botnet domain name registration was received. Registry 203 may then decide to take appropriate action regarding the requested (and already registered) domain name. For example, in one embodiment Registry 203 may decide to initiate the removal of the requested (and already registered) domain name from the DNS zone.

The invention claimed is:

1. A method for administering a top-level domain across a domain name system (DNS), the method comprising:
   receiving, at a registry, a request to register a domain name on behalf of a registrant;
   initiating a name check of the requested domain name to determine if the requested domain name corresponds to a known malicious domain name;
   processing the requested domain name such that:
      if the name check has determined that the requested domain name does not correspond to the known malicious domain name, the requested domain name is added to the DNS;
      if the name check has determined that the requested domain name corresponds to the known malicious domain name, the requested domain name does not appear in the DNS after more than a predetermined number of DNS update operations; and
      information regarding the domain name registration request is stored in a registry database, even if the name check has determined that the requested domain name corresponds to the known malicious domain name.

2. The method of claim 1, comprising setting an indicator associated with the requested domain name.

3. The method of claim 2, comprising setting an indicator that prevents the requested domain name from being added to the DNS.

4. The method of claim 2, comprising setting an indicator that causes the requested domain name to be removed from the DNS.

5. The method of claim 1, comprising setting at least one status code associated with the requested domain name.

6. The method of claim 5, comprising setting a status code that prevents the requested domain name from being added to the DNS.

7. The method of claim 5, comprising setting a status code that causes the requested domain name to be removed from the DNS.

8. The method of claim 5, comprising defining multiple server status codes as a status set.

9. The method of claim 8, comprising defining the status set to include at least one of serverHold, serverUpdateProhibited, serverDeleteProhibited, or serverTransferProhibited.

10. The method of claim 1, further comprising returning a successful registration response to a registrar.

11. The method of claim 1, further comprising returning a report of domain names stored in the registry database that correspond to a known malicious domain name.

12. The method of claim 1, further comprising:
   determining that the requested domain name has already been registered;
   generating a report on the requested domain name; and
   taking action in response to determining that the requested domain name corresponds to the known malicious domain name.

13. The method of claim 12, further comprising returning a message that the requested domain name has already been registered.

14. A method for administering an n-level domain across a domain name system (DNS), the method comprising:
   receiving, in a registry database, a watch list of at least one known malicious domain name;
   propagating the watch list across at least one n-level domain;
   receiving, at a registry, a request to register a domain name on behalf of a registrant;
   accessing the watch list to determine if the requested domain name corresponds to one of the malicious domain names in the watch list;
   processing the requested domain name such that:
      if the requested domain name does not correspond to a known malicious domain name, the requested domain name is added to the DNS;
      if the requested domain name corresponds to a known malicious domain name, the requested domain name does not appear in the DNS after more than a predetermined number of DNS update operations; and
      information regarding the domain name registration request is stored in the registry database, even if the requested domain name corresponds to a known malicious domain name.

15. The method of claim 14, comprising setting an indicator associated with the requested domain name.

16. The method of claim 15, comprising setting an indicator that prevents the requested domain name from being added to the DNS.

17. The method of claim 15, comprising setting an indicator that causes the requested domain name to be removed from the DNS.

18. The method of claim 14, comprising setting at least one status code associated with the requested domain name.

19. The method of claim 18, comprising setting a status code that prevents the requested domain name from being added to the DNS.

20. The method of claim 18, comprising setting a status code that causes the requested domain name to be removed from the DNS.

21. The method of claim 18, comprising defining multiple server status codes as a status set.

22. The method of claim 21, comprising defining the status set to include at least one of serverHold, serverUpdateProhibited, serverDeleteProhibited, or serverTransferProhibited.

23. The method of claim 14, further comprising:
   determining that the requested domain name has already been registered;
   generating a report on the requested domain name; and
   taking action in response to determining that the requested domain name corresponds to the known malicious domain name.

24. The method of claim 23, further comprising returning a message that the requested domain name has already been registered.

25. A method for administering a top-level domain across a domain name system (DNS), the method comprising:
   receiving, at a registry for the top-level domain, a request from a registrar, to register a domain name for a registrant;
   initiating a name check of the requested domain name to determine if the requested domain name corresponds to a known malicious domain name;
   determining that the requested domain name corresponds to the known malicious domain name based on the name check that was initiated; and
   storing information regarding the request for domain name registration in a registry database.

26. The method of claim 25, further comprising:
   determining that the requested domain name does not corresponds to the known malicious domain name based on the name check that was initiated;
   adding the requested domain name to the DNS; and
   storing information regarding the request for domain name registration in a registry database.

27. The method of claim 26, wherein the information that is stored comprises the requested domain name.

* * * * *